(12) United States Patent
Moat et al.

(10) Patent No.: US 7,289,528 B2
(45) Date of Patent: Oct. 30, 2007

(54) COMPONENT INTERCONNECT WITH SELF-CLOCKING DATA

(75) Inventors: Kent D. Moat, Winfield, IL (US); Brian G. Lucas, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 791 days.

(21) Appl. No.: 10/651,868

(22) Filed: Aug. 29, 2003

(65) Prior Publication Data

US 2005/0047430 A1    Mar. 3, 2005

(51) Int. Cl.
*H04L 12/403* (2006.01)
(52) U.S. Cl. ...................... 370/450; 370/454
(58) Field of Classification Search ........... 370/450, 370/454, 456, 459, 461, 462, 449
See application file for complete search history.

(56) References Cited

U.S. PATENT DOCUMENTS

| | | | |
|---|---|---|---|
| 4,654,655 A | 3/1987 | Kowalski | |
| 5,068,849 A * | 11/1991 | Tanaka | 370/509 |
| 5,400,340 A | 3/1995 | Hillman et al. | |
| 5,493,570 A | 2/1996 | Hillman et al. | |
| 5,511,166 A * | 4/1996 | Travaglio et al. | 709/250 |
| 5,615,404 A | 3/1997 | Knoll et al. | |
| 5,694,555 A | 12/1997 | Morriss et al. | |

* cited by examiner

*Primary Examiner*—Brenda Pham

(57) ABSTRACT

A communication signal for transmitting a sequence of tokens over an interconnection having three wires in which each of the three wire transmits a signal corresponding to one bit of a 3-bit symbol. The tokens are determined by the transitions between the symbols. In one embodiment, RF emission is minimized and self-clocking is achieved by changing exactly one bit of a symbol at each transition. A receiver detects a transition in the signal on one of the three wires, identifies the transition from the previous and current 3-bit symbols and determines the information token associated with the transition.

10 Claims, 5 Drawing Sheets

COMPONENT INTERCONNECT WITH SELF-CLOCKING DATA

FIELD OF THE INVENTION

This invention relates generally to the field of data communication. More particularly, certain embodiments of this invention relate to a method and apparatus for interconnecting electronic components

BACKGROUND OF THE INVENTION

A number of interconnect protocols are in current use. These include Serial Peripheral Interface (SPI), Inter-Integrated Circuit (I2C), Controller Area Network (CAN) bus, Universal Serial Bus (USB) and "Firewire" serial bus (IEEE1394).

SPI is a three wire, unidirectional (four if bidirectional) interconnection with a unidirectional clock, data, and framing signals. It is low cost but has a low bit rate of less than 1M bits/sec. RF emission is high since each bit transferred generates at least two signal transitions. Tolerance to signal skew is low—less than half a bit time. The ability to address multiple components requires a separate framing signal for each destination.

I2C is a two-wire bidirectional interconnection with bidirectional clock and data signals. It is low cost bus has a low bit rate of less than 500K bits/sec. Like SPI, each bit generates at least two signal transitions and its tolerance to signal skew is low at less than half a bit time. Since signals in I2C are shared and bidirectional, the signal drivers are more complex than SPI. Addressing capability is provided in a header within the packet but the recognition and decoding of the destination requires more logic and power than SPI.

CAN is a two wire interconnect with a single differential, bidirectional data signal. It is low cost but has a low bit rate of less than 1M bits/sec. Each bit can generate as much as two transitions and tolerance to skew of the differential signal is less than half a bit time. Since the signal is shared and bidirectional, the differential signal drivers are more complex than SPI. Since there is no clock signal, bit synchronization must be provided by a local clock that is phase locked to the data signal transitions. This local clock consumes power even during packet transfers for other destinations as well as during idle times. Addressing capability is provided in a header within the packet but the recognition and decoding of the destination requires more logic and power than SPI.

USB is a two wire interconnection with a single differential, bidirectional data signal. It is higher cost but has a high bit rate of up to 480M bits/sec. Each bit can generate as much as two transitions and tolerance to skew of the differential signal is less than half a bit time. Since the signal is shared and bidirectional, the drivers are more complex than SPI. In addition, out-of-band voltages must be detected/sent by the drivers since they are used to signal non-data events like end-of-frame. Like CAN, USB requires a local clock that is phase locked to the signal transitions and which consumes power even during idle time.

IEEE1394 is a four wire interconnection with differential, bidirectional clock and data signals. It is higher cost but has a high bit rate of up to 400M bits/sec. Each bit generates only one transition for low RF emissions and tolerance to signal skew between clock and data is high at almost one bit time. Like USB, IEEE1394 requires a local clock that is phase locked to the clock and data transitions and which consumes power even during idle time.

Ideally, a means of interconnecting functional subsystems embodied within separate components to form a cohesive system would have the following attributes:

High bit rate of at least 10M bits/sec,
Low silicon cost in gates, signal drivers, and pin count,
Low power, especially when idling,
Low RF emissions.

This means of interconnecting would make it possible to mix, match, or replace components in various combinations to create new products or incrementally improve a product. None of the interconnect technologies described above provide all of these attributes.

A fast, inexpensive interconnect would allow the architecture of component designs to be rearranged along boundaries of system functions rather than hardware functions. This would reduce risk by focusing each component design on implementing a group of related functions rather than on implementing and integrating functions, sometimes unrelated, into one component. This, in turn, would also increase the likelihood of component reuse since many related functions are more likely to be useful elsewhere than a collection of unrelated functions.

OVERVIEW OF CERTAIN EMBODIMENTS OF THE INVENTION

Certain embodiments consistent with the present invention relate generally to data communication. Objects, advantages and features of the invention will become apparent to those of ordinary skill in the art upon consideration of the following detailed description of the invention.

In accordance with certain exemplary embodiments consistent with the invention, a communication signal for transmitting a sequence of tokens over an interconnection having three wires is provided, in which each of the three wires transmits a signal corresponding to one bit of a 3-bit symbol. The tokens are determined by the transitions between the symbols. In one embodiment, RF emission is minimized and self-clocking is achieved by changing exactly one bit of a symbol at each transition. A receiving component or device detects a transition in the signal on one of the three wires, identifies the transition from the previous and current 3-bit symbols and determines the corresponding information token associated with the transition.

BRIEF DESCRIPTION OF THE DRAWINGS

The novel features believed characteristic of the invention are set forth in the appended claims. The invention itself, however, together with objects and advantages thereof, will best be understood by reference to the following detailed description of certain illustrative embodiments consistent with the present invention when read in conjunction with the accompanying drawing(s), wherein:

DETAILED DESCRIPTION

Figure 1:
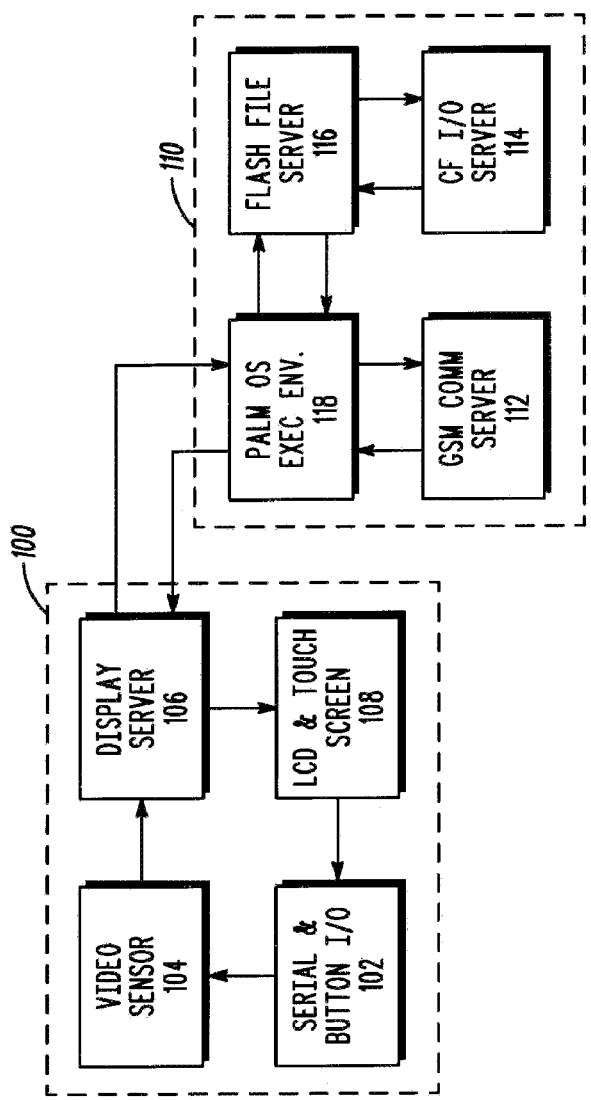
FIG. 1 is a diagrammatic representation of an exemplary application of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

In accordance with certain embodiments of the present invention is a method for encoding data for transmission as unidirectional signals over a three-wire data interconnection to a receiving component (i.e., a receiving device or receiver). The signals use normal logic levels and are point-to-point, rather than shared, in to order to use simple, low cost drivers. The three signals allow transmission of eight symbols where one symbol, all ones, is reserved to indicate an idle condition and one symbol, all zeroes, is used to indicate an aborted packet transfer and receiving component reset. The remaining symbols encode each bit of data such that one and only one signal transition must occur for each bit transferred. This encoding limits the first symbol of each packet to one of three and this symbol is interpreted by the receiver as a destination address. One of the possible three destinations is always the receiving component (named herein the local component, or local device) while the other two may indicate routing of the remainder of the packet to other components (named herein as external components, or external devices) connected to the receiving component. In the latter case, subsequent bits in the packet may be interpreted by subsequent receiving components as further destination addresses.

An advantage of this encoding scheme is that it eliminates the need for a local bit-clock at the receiving component, since the signal transitions can be used to drive the necessary logic. Since only one transition can occur at a time, tolerance to signal skew can be as high as almost one bit time. Packet framing is easily detected as any non-idle symbol must fall within a packet boundary. Bit decoding can be done by a simple logic function of the last and current symbol. Addressing is easily decoded and routing is simple enough to be handled by interface logic without intervention by a processor.

An exemplary application of the present invention is shown in FIG. 1. Referring to FIG. 1, a number of functional components or subsystems are interconnected to form a Personal Communication System. A group of subsystems 100 comprises a serial and button input/output device 102, a video sensor 104, a display server 106 and an LCD touch screen 108. The interconnections between the devices are indicated by the arrows. Only unidirectional communication is used within this group of systems. A second group of subsystems 110, which includes a GSM communication server 112 (cellular telephone server), a Compact Flash I/O server 114 (internet or web application server), a Flash File server 116 and an executive environment 118 that uses a Palm operating system. Interconnections between the subsystems in this group are bi-directional and use two unidirectional interconnections.

Figure 2:
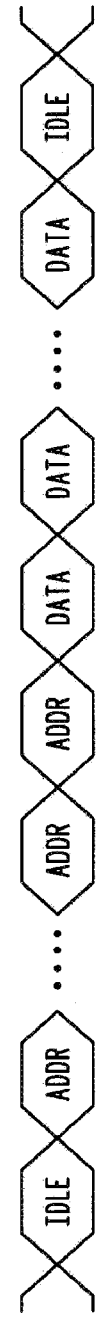
FIG. 2 is an illustration of an exemplary information packet in accordance with an embodiment of the invention.

Information is transmitted between subsystems using a packet format. FIG. 2 shows a sequence of symbols forming an exemplary packet. Each symbol is made up of three bits. The packet is framed by "idle" symbols. In one embodiment, the idle symbol is "111", i.e. three ones. The packet includes a sequence of address symbols, that is, symbols which are encoded from address or routing information, and a sequence of data symbols encoded from data tokens. A symbol immediately following an idle symbol is either another idle signal or an address symbol denoted by "ADDR" in the figure. The address symbols encode routing information and indicate whether the receiving device is the final destination of the packet. Following the sequence of address symbols is a sequence of data symbols. The end of the packet is indicated by another idle symbol. If the interconnection is broken, or if it is desirable to abort the transmission, an abort symbol "000" is sent.

Each symbol only differs from the preceding symbol in exactly one bit-position. This approach minimizes RF emission from the interconnection. In addition, the signal transitions may be used to identify boundaries between symbols, so the receiving device does not need to be synchronized to the sending device and does not require a local bit clock.

An exemplary encoding scheme is shown in TABLE 1. The second column in TABLE 1 indicates the current symbol, that is the symbol following a transition in one of the signal lines. The first column in TABLE 1 indicates the preceding symbol, that is the symbol before a transition in one of the signal lines. The third column indicates the meaning or token assigned to the pair of symbols.

TABLE 1

| Preceding Symbol | Current Symbol | Meaning |
|---|---|---|
| 111 | 110 | Local destination |
| 111 | 101 | Route to external destination 1 |
| 111 | 011 | Route to external destination 2 |
| 110 | 100 | Bit value 0 |
| 110 | 010 | Bit value 1 |
| 101 | 100 | Bit value 0 |
| 101 | 001 | Bit value 1 |
| 011 | 010 | Bit value 0 |
| 011 | 001 | Bit value 1 |
| 100 | 101 | Bit value 0 |
| 100 | 110 | Bit value 1 |
| 010 | 011 | Bit value 0 |
| 010 | 110 | Bit value 1 |
| 001 | 011 | Bit value 0 |
| 001 | 101 | Bit value 1 |
| XXX | 000 | Abort current transfer |
| XXX | 111 | Idle |

Other encoding schemes may be used without departing from the present invention. Different exemplary coding schemes using three signals are described herein. In the exemplary encoding scheme, the symbol having three ones is taken to be an idle symbol, that is, the symbol to be transmitted when no data is being transferred. The symbol comprising three zeros is used to indicate that transmission has stopped. Packets of information symbols are therefore framed by idle symbols. Other symbols may be used as the abort symbol. However, the all-zeros symbol is most likely to occur when positive logic is used and a system fails, while the all-ones symbol is most likely to occur when negative logic is used and a system fails.

Figure 3:
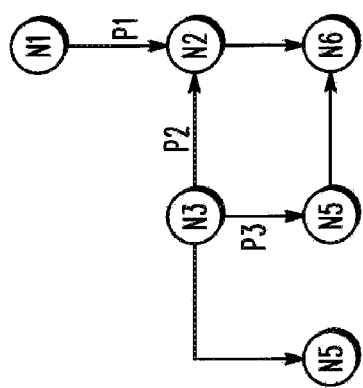
FIG. 3 is a diagrammatic representation of an exemplary network of devices.

The interconnection technique of the present invention may be used for communication between devices or nodes of a network. An exemplary network is shown in FIG. 3; however, a variety of network topologies may be used including chains, trees, rings and combinations thereof. The exemplary network shown in FIG. 3 comprises six nodes. Using the encoding scheme described with reference to Table 1, each node may transmit to no more than two other nodes, so some nodes of the network are not directly connected to each other; data intended for a destination node other than the receiving node must pass through intermediary nodes and has routing information encoded in the address symbols. When a packet is received by an intermediary node, the routing information is modified and the packet is re-transmitted to other intermediary nodes until it reaches a destination node. However, using another encoding scheme that is in accordance with the present invention, the nodes may have more than two direct connections, and network can be directly connected if required. For example, the address symbols may be used to encode the binary address of the destination node.

Figure 4:
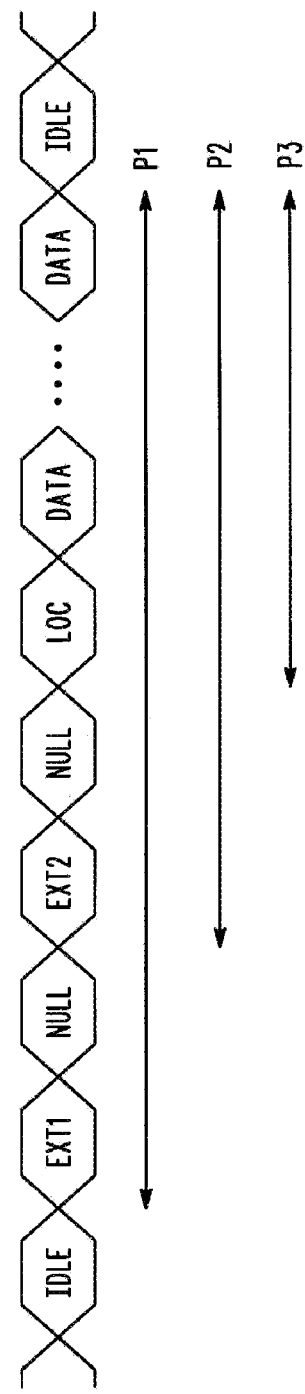
FIG. 4 is a further illustration of an information packet in accordance with an embodiment of the invention.

An exemplary packet format for inter-nodal communication is shown in FIG. 4. An encoding scheme that is suitable to provide the packet format of FIG. 4 and thereby provide direct connection is described below with reference to FIGS. 8 and 9. Referring to FIG. 4, the initial idle symbol is followed by five address symbols EXT1, NULL, EXT2, NULL and LOC that encode the routing tokens EXT1 and EXT2 and the local address token LOC. NULL symbols separate the tokens and ensure that only one bit of the signal changes at each transition. The address symbol immediately following an idle symbol is interpreted as an instruction to decode the following data at the local device or to transmit it to an external device. This packet is transmitted from node N1 in FIG. 3 to node N2 along the path P1. In this example, EXT1 denotes the left branch from the node N2, which is the link to node N3. The EXT1 symbol and the following NULL symbol are stripped from the packet and it is forwarded along path P2 to node N3. EXT2 denotes the right branch from node N3, which is linked to node N5. The EXT2 symbol and the following NULL symbol are stripped from the packet and it is forwarded along path P3 to node N5. Node N5 receives an idle symbol followed by the LOC symbol, which indicates that N5 is the final destination of the packet. The packet is then decoded at node N5. In this manner, the packet is transmitted form node N1 to node N5 across the network. When the LOC symbol is received immediately following an IDLE symbol, it indicates that the symbols following the LOC symbols are to be decoded as data tokens. The properties of the packet (i.e. exactly one bit change at each transition and an odd number of symbols in the packet) are maintained. The stripping of the address and NULL symbols is illustrated in FIG. 4. The packet starting at EXT1 and indicated by the arrow P1 is passed from node N1 to node N2. The packet starting at EXT2 and indicated by the arrow P2 is passed from node N2 to node N3. The packet starting at LOC and indicated by the arrow P3 is passed from node N3 to node N5. This addressing scheme allows packets to be transmitted to the destination device without having to store them on the intermediate device.

In the embodiment described above, the LOC symbol is effectively used as a separator between symbols specifying routing information and symbols specifying data information. In a further embodiment, address symbols between an IDLE symbol and a LOC symbol are decoded as the binary address of the destination node, thereby allowing a node in a network to be directly connected to an arbitrary number of other nodes.

The packet of symbols is transmitted over a three-wire interconnection. Each of the three symbol bits is assigned to a particular wire. In the example shown in FIG. 5, the right-most bit is designated at bit 0, the center bit as bit 1 and the left-most bit as bit 2. In this example the bit stream is encoded 00101001 as a packet transmitted between adjacent nodes in a network of devices. The source device starts with the original (decoded) bit-stream then adds idle tokens as packet frames together with the local address symbol (LOC). The idle token is encoded as 111 and the local address is encoded as 110. The first 0 bit is encoded with reference to TABLE 1. In TABLE 1 the transition from 110 to 100 represents the value zero, the next token is encoded as 100. The process is continued until the symbol packet is completed. The symbol packet is then transmitted as voltage level signals on the three-wires of the interconnect. The resulting signal levels are shown as the three lines at the top of FIG. 5. Within the signal packet, there is exactly a one signal transition at each symbol change. Hence, there is no need for the receiving device to have a local clock, since the signal transitions indicate the changing symbols.

Figure 5:
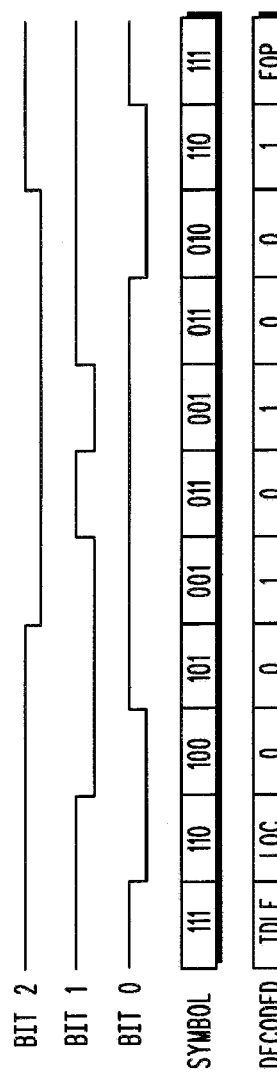
FIG. 5 is a diagrammatic representation of an exemplary communication signal in accordance with an embodiment of the invention.

The receiving device receives the three signals from the three-wire interconnection. When the interconnection is idle (i.e. when no data is being transmitted) there are no signal transitions. Whenever a signal transition occurs in one of the three wires, it indicates that a new symbol has been transmitted. The corresponding symbol is obtained from the levels of the three signals. The symbols are then decoded using TABLE 1, or an equivalent logic circuit, by examining the current symbol and the preceding symbol. The resulting decoded sequence of tokens is shown at the bottom of FIG. 5. Each packet comprises an odd number of symbols so as to ensure that the final transition from a symbol to the idle symbol produces a change in only one bit.

Figure 6:
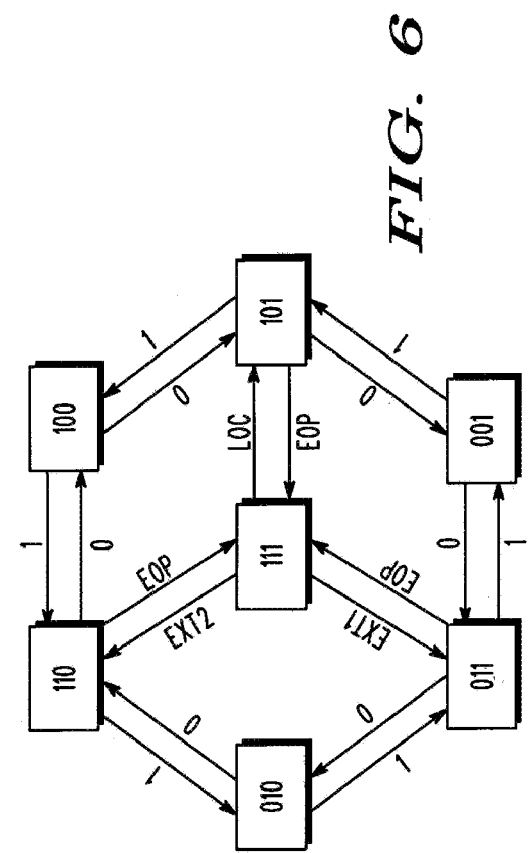
FIG. 6 is a diagrammatic representation of an exemplary encoding scheme in accordance with an embodiment of the invention.

A further example of an encoding scheme is shown in FIG. 6. Referring to FIG. 6, each box denotes a possible symbol or state of the interconnection. The 000 symbol is used as an abort or reset symbol and is not dependent upon its preceding symbol. Each possible transition between symbols or states is assigned a token, such as a data value, an address or an instruction. For example, the transitions from the symbol 111 denote a local address (LOC) or one of two external addresses (EXT1, EXT2). These transitions also indicate the start of a data packet. Transitions to the symbol 111 denote the end of a data packet (EOP). In this example, a clockwise transition denotes the value zero and a counter-clockwise transition denotes the value one. In contrast to prior schemes, the token cannot be determined from the current symbol alone, since the information is encoded into the transition. In general, a set of symbols is selected and set of transitions between them defined. Information tokens are then attached to each transition. In the present embodiment, the tokens are the values 0 and 1, the three, address tokens and the end-of-packet (EOP) token.

Figure 7:
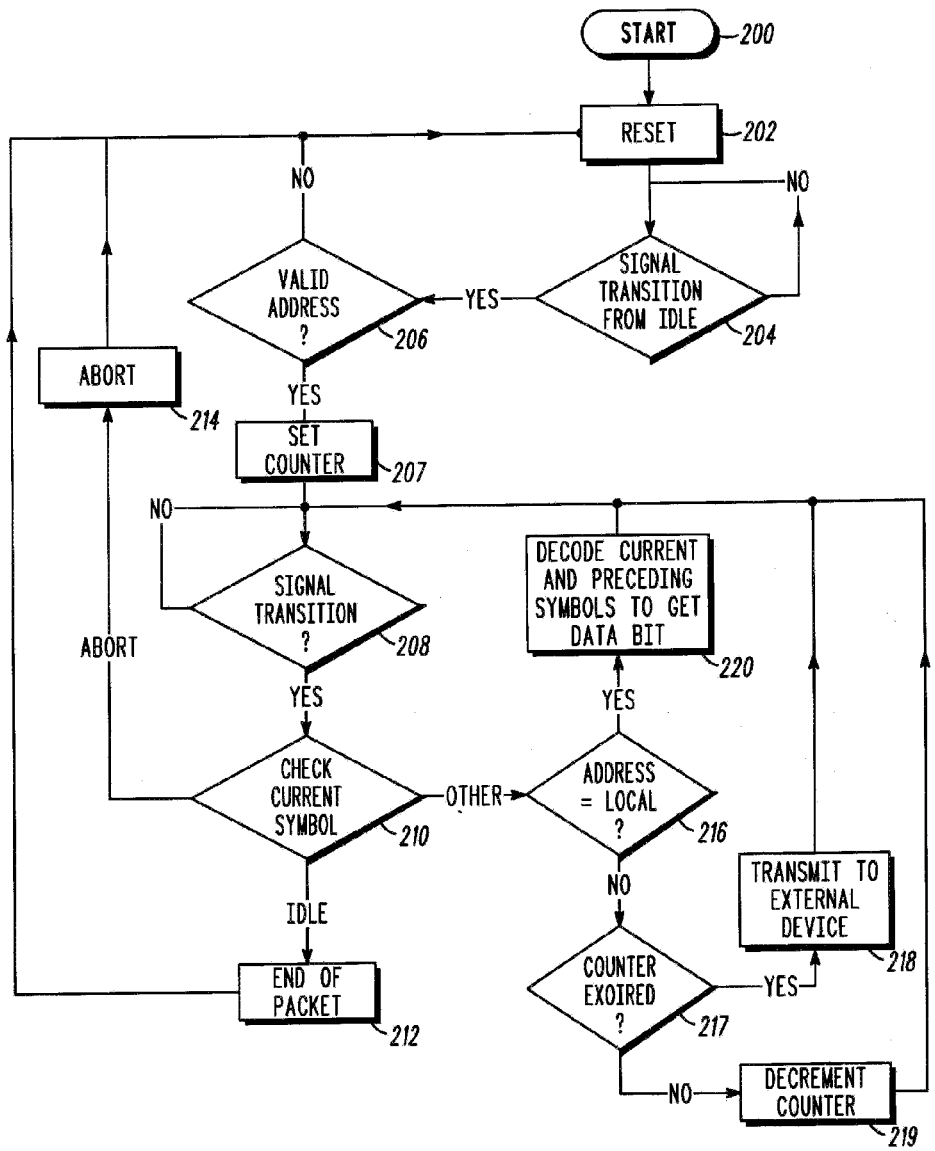
FIG. 7 is a flow of a method for receiving a communication signal in accordance with an embodiment of the invention.

FIG. 7 is a flow chart illustrating an embodiment of a method of decoding a received signal that corresponds, for example, to the embodiments described with reference to FIG. 2 and Table 1. Referring to FIG. 7, following start block 200, the decoder is reset at bock 202 and a signal transition in any of the three wires of the interconnection is detected at decision block 204. As depicted by the negative branch from decision block 204, the detection process continues until a signal transition is detected. As indicated by the positive branch from decision block 204, the initial signal transition indicates the start of packet of symbols. The first symbol following the idle symbol is an address symbol, which is checked at decision block 206 to see if the address is valid. If the address is invalid, as indicated by the negative branch from decision block 206, the decoder is reset at block 202. If the address is valid, flow continues to decision block 207, where a counter is set to the number of symbols to be removed from the packet. If the LOC symbol is found, a symbol counter is set to zero, since the following symbols encode the data tokens. If an EXT1 or EXT2 symbol is encountered, the symbol counter is set to two to indicate that two symbols are to be removed before the packet is retransmitted. The system then waits for another signal transition, as indicated by decision block 208. If a signal transition is detected, as indicated by the positive branch from decision block 208, the new symbol is checked at decision block 210. An idle symbol indicates the end of a packet, as indicated by block 212. An abort signal indicates that the transmission should be aborted, as indicated by block 214 and the process returns to reset block 202 and waits for the start of a new packet. If the new symbol is neither an idle symbol nor an abort symbol, flow proceeds to decision block 216, where address is checked to determine if the address indicates that the local device is the final destination for the packet. If the address corresponds to an external device, as indicated by the negative branch from decision block 216, the first two symbols, which define the external address, a check to made to determine if the symbol counter has expired (reached zero). If the symbol counter has expired, as indicated by the negative branch from decision block 216, the symbol is transmitted to the appropriate external device at block 218. If the symbol counter has not expired, as indicated by the positive branch from decision block 217, the counter is decremented at block 219. It is to be noted that, in the absence of contrary instructions, the idle symbol is continually transmitted to the external device (i.e. the signal lines are held high). As a consequence, the packet is self-framing and no special framing sequence needs to be transmitted. If the local device is the final destination of the packet, as indicated by the positive branch from decision block 216, the symbol is decoded at block 220 in accordance the current symbol and the preceding symbol.

Figure 8:
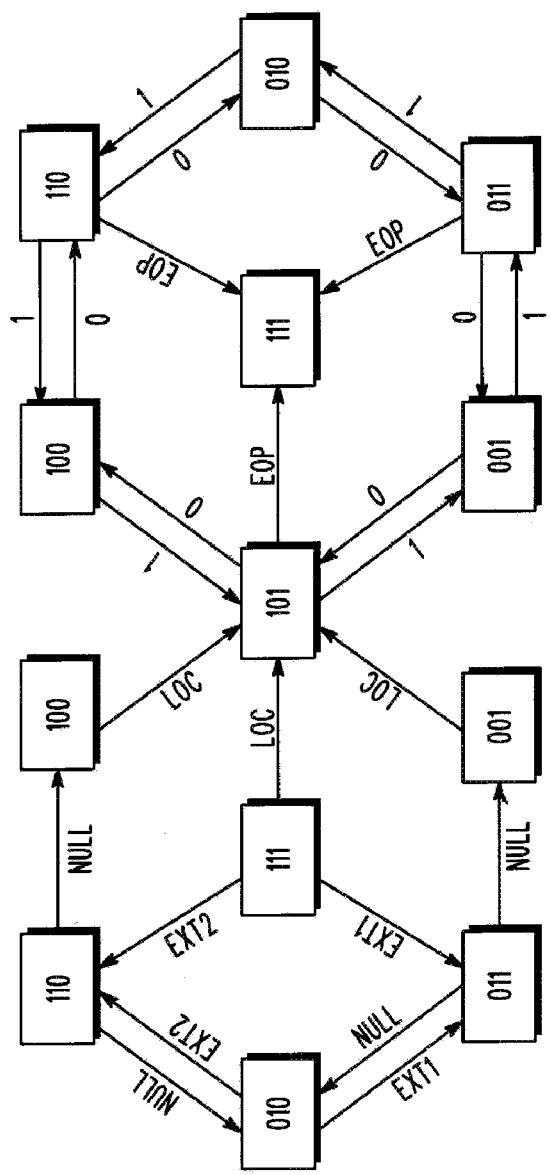
FIG. 8 is a diagrammatic representation of a further exemplary encoding scheme in accordance with an embodiment of the invention.
Figure 9:
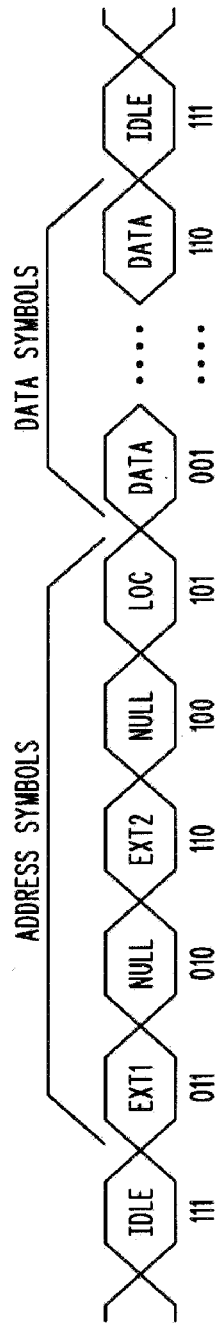
FIG. 9 is an illustration of packet encoding in accordance with an embodiment of the invention.

A still further example of an encoding scheme is shown in FIG. 8. Referring to FIG. 8, each box denotes a possible symbol or state of the interconnection. The 000 symbol is used as an abort or reset symbol and is not dependent upon its preceding symbol. Each possible transition between symbols or states is assigned a token, such as a data value, an address or an instruction. This encoding scheme may be used for network communication as described above. Application of the encoding scheme to the token sequence shown in FIG. 4 is illustrated in FIG. 9. Referring to FIG. 9, the encoding begins at the 111 symbols on the left of the figure. The EXT1 token is encoded first by the transition to 011. The EXT2 token is then encoded by the transition to the symbol 110 via the symbol 010. Insertion of the extra symbol ensures that only one bit of the signal changes at each transition. The LOC token is then encoded by the transition to the symbol 101 via the symbol 100. The data is then encoded using the right hand portion of FIG. 8, and the end of the packet is coded by the final transition to 111.

It will be apparent to those of ordinary skill in the art that other coding schemes may be used. For example, if RF emission and self-clocking are not primary concerns, additional transitions may be used. One embodiment allows one or two bits to change at each transition. This allows for four possible transitions, so two bits are encoded on each transition, doubling the speed of the interconnection. However, skew tolerance is reduced and RF emission is increased.

Those of ordinary skill in the art will recognize that the present invention could be implemented on a programmed processor or may use hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for transmitting a sequence of tokens over an interconnection from a source device to a destination device as a sequence of symbols, the method comprising:
    for each new token in the sequence of tokens:
        identifying a new symbol for which the new token is assigned to a transition of a set of transitions from a current symbol to a new symbol;
        transmitting the new symbol; and
        replacing the current symbol with the new symbol,
    wherein the current symbol differs from the new symbol in at least one bit position.

2. A method in accordance with claim 1, wherein the current symbol differs from the new symbol in exactly one bit position.

3. A method in accordance with claim 1, further comprising transmitting a reference symbol following the transmission of the last new symbol.

4. A method in accordance with claim 1, wherein the set of symbols includes an abort symbol and further comprising transmitting an abort symbol if transmission is to be aborted.

5. A method in accordance with claim 1, wherein the set of tokens includes a local address token and at least one external address token.

6. A method in accordance with claim 5, wherein the sequence of symbols immediately following the reference symbol define a sequence of external address tokens followed by a local address token.

7. A method in accordance with claim 6, wherein the sequence of external address tokens is interleaved with a sequence of null tokens.

8. A method in accordance with claim 6, further comprising:
    transmitting the sequence of symbols to a first device;
    if the first token is an external address token:
        selecting a next device according the first token;
        transmitting subsequent symbols to the next device.

9. A method in accordance with claim 1, wherein the symbols comprise 3-bit symbols.

10. A method in accordance with claim 9, the reference symbol is defined as 111 and wherein the set of symbols includes an abort symbol defined as 000.

* * * * *